United States Patent [19]

Nessel, deceased et al.

[11] 4,352,560

[45] Oct. 5, 1982

[54] SELF-LEVELING AND GRADE SETTING LASER APPARATUS

[76] Inventors: Jiri M. Nessel, deceased, late of Palo Alto, Calif.; by Alena Alexander, administrator, Menlo Park, Calif.

[21] Appl. No.: 203,436

[22] Filed: Nov. 3, 1980

[51] Int. Cl.³ .............................................. G01C 15/00
[52] U.S. Cl. .................................... 356/247; 356/153
[58] Field of Search ............... 356/138, 153, 247, 248, 356/249

[56] References Cited

U.S. PATENT DOCUMENTS 3,876,309  4/1975  Zicaro et al. .................... 356/138 X
3,997,267 12/1976  Met ................................. 356/248 X
4,119,382 10/1928  George et al. .................. 356/153 X Primary Examiner—John K. Corbin
Assistant Examiner—Matthew W. Koren
Attorney, Agent, or Firm—C. Michael Zimmerman

[57] ABSTRACT

A pivotally-mounted laser or other collimated light beam source is maintained in a level position by means of a thermal motor capable of precise small movements. Actuation of the motor is accomplished by a control amplifier whose inputs are responsive to the output of a level-sensitive transducer. Pre-selected grades may be established and maintained by means of a second thermal motor which is employed to change the angular relationship between the pivotally mounted laser or light source and the level-sensitive transducer.

7 Claims, 4 Drawing Figures

SELF-LEVELING AND GRADE SETTING LASER APPARATUS

BACKGROUND OF THE INVENTION

The present invention relates to self-leveling and grade setting construction lasers and is an improvement upon the prior art in that its novel use of thermal motors results in a laser leveling and grade setting system which is more rugged, more accurate, and more cost efficient than prior systems.

The prior art utilized rotary electric motors to level laser beam support structures after upset and to set variable pre-determined grades of the laser beam. The drive systems of such motors are complex and, since the minimum rotational speed of such motors must be relatively high to assure dependable starting operation, further complex means, such as fine thread screws, stepping, motors, or pulsing of the motor at low voltage, must be utilized to reduce the rotational speed of the laser on its pivot axis to an acceptable rate of approximately 60 arc-seconds per minute. These intricate motor systems are expensive, difficult to produce, and are of uncertain dependability and accuracy. Further inaccuracies are created by the inertia of a rotary motor's armature which can cause excessive oscillation of backlash in the beam positioning system.

The present invention by means of its novel use of thermal motors reduces the number of components in the motor system of a self-leveling and grade setting laser by approximately a factor of ten. Merely due to this reduction in the number of components, large production and maintenance cost savings are made possible. However, it is also true that thermal motors are inherently more rugged and dependable than rotary motors in the laser leveling and grade setting context and are therefore also more cost efficient on those grounds.

Far greater accuracy is also made possible by use in the present invention of thermal motors, which are practically free of backlash, and are free of inertia produced oscillation of the laser beam.

The present invention has the further advantage that it is easily adaptable to use in self-leveling and grade setting lasers presently being manufactured. This is due to the compactness of the thermal motors used in the present invention and their size compatibility with the structures used in presently manufactured lasers, as well as to the facility with which an embodiment of the present invention can be designed to match the impedence of existing electronic drives.

SUMMARY OF THE INVENTION

The present invention provides means for the automatic leveling of a laser or other collimated light beam. Briefly, the invention comprises a thermal motor attached to a lasertube or other light beam projector, together with means of regulating the expansion and contraction of the thermal motor so as to automatically maintain the light beam in a level state.

Thus described, the invention has many applications and is novel and useful even in this simple form. However, a further object of the invention is to provide means for setting the laser or other collimated light beam at a variable, pre-determined grade. This is accomplished by use of a second thermal motor placed so that its linear motion will disturb the parallel relationship between the light beam and the reference level state of the self-leveling system, together with means for sensing and adjusting the interior temperature of such thermal motor so as to produce a correspondence between the grade set on a numerical grade readout and the grade produced by the expansion or contraction of the thermal motor.

DESCRIPTION OF THE PREFERRED EMBODIMENT

Figure 1:
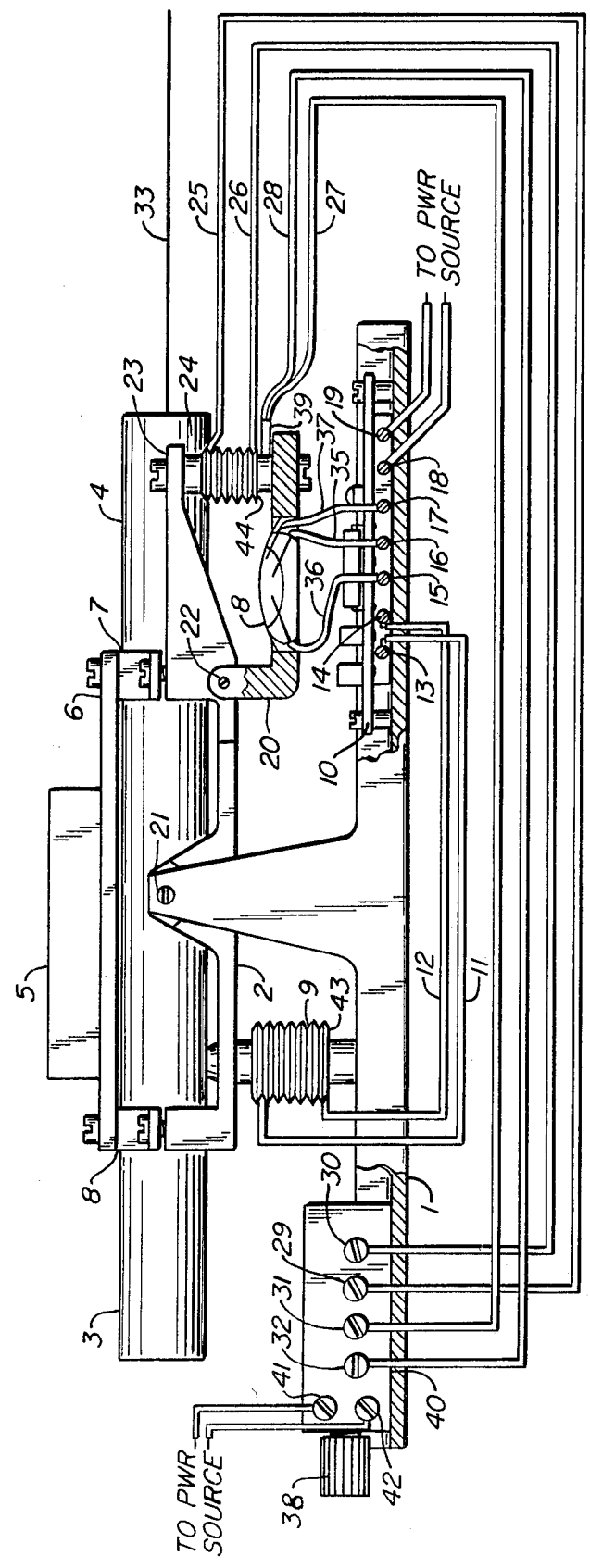
FIG. 1 is a partially cross-sectional side view of a preferred embodiment of the apparatus of the invention.

Referring to FIG. 1, a preferred embodiment of the invention is shown in a partially cross-sectional side view. Base 1 is shown supporting cradle 2 on pivot axis 21. Lasertube 3 rests on cradle 2 and is secured by lasertube clamps 7, which also serve to support laser power supply bridge 6 and laser power supply 5. Cradle extension arm 23 is part of cradle 2. Collimated laser beam 33 is projected from collimator 4. The entire embodiment of the invention is enclosed by cylindrical housing 34.

Transducer platform 20 is attached to cradle extension arm 23 by means of pivot axis 22, and supports electrical leveling transducer 8 together with level bridge balancing leads 35 and 37 and level bridge center lead 36. Grade thermal motor 24 is suspended vertically between transducer platform 20 and cradle extension arm 23, attaching to both, and is penetrated by thermal sensor 39 from which extend thermal sensor leads 27 and 28.

Grade thermal motor energizing leads 25 and 26 extend from heating coil 44 to grade setting electronic circuit unit 40, attaching at grade thermal motor energizing terminals 29 and 30. Thermal sensor leads 27 and 28 are also connected to grade setting electronic circuit unit 40, attaching at thermal sensor terminals 31 and 32. The remaining pictured features of grade setting electronic circuit unit 40 are grade setting knob 38 and grade setting power supply terminals 41 and 42.

Suspended between cradle 2 and base 1 is leveling thermal motor 9, with heating coil 43 from which extend leveling thermal motor energizing leads 11 and 12. Leveling thermal motor energizing leads 11 and 12 are connected to electronic transducer control circuit board 10, attaching at leveling thermal motor output terminals 13 and 14. Electronic leveling transducer center lead input terminal 15 connects to level bridge center lead 36, while electronic leveling transducer balancing lead input terminals 16 and 17 connect to level bridge balancing leads 35 and 37. Self-leveling system power supply leads 18 and 19 connect to an exterior power source (not shown).

Figure 2:
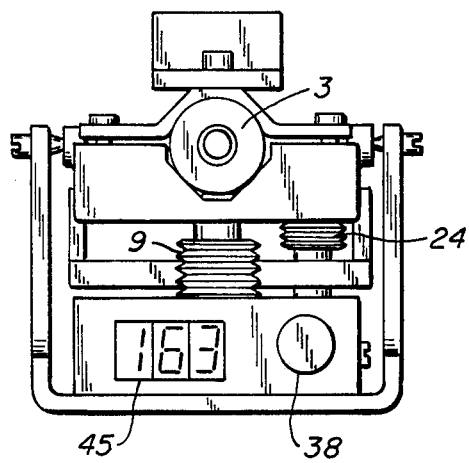
FIG. 2 is a rear view of a preferred embodiment of the apparatus of the invention.

Referring to FIG. 2, a rear view of a preferred embodiment of the invention is shown. The numbering in this figure corresponds to the numbering in FIG. 1. Further shown in this figure is numerical grade readout 45 which is part of grade setting electronic circuit unit 40.

Figure 3:
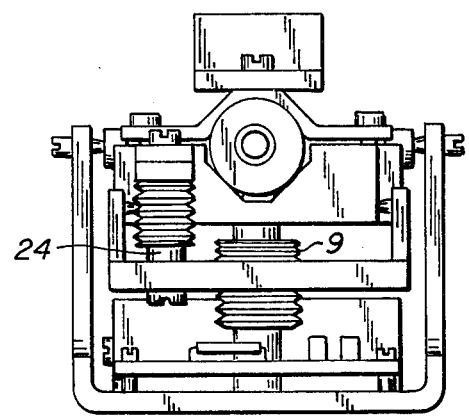
FIG. 3 is a front view of a preferred embodiment of the apparatus of the invention.

Referring to FIG. 3, a front view of a preferred embodiment of the invention is shown. The numbering in this figure corresponds to the numbering in FIGS. 1 and 2.

Figure 4:
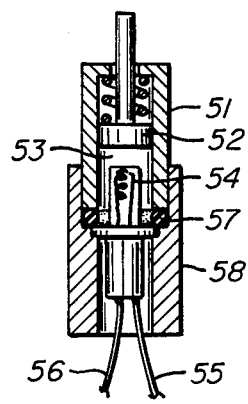
FIG. 4 is a cross-sectional side view of a plunger-type thermal motor.

Referring to FIG. 4, a cross-sectional side view of a plunger-type thermal motor is shown. Hydraulic cylinder 51 is filled with expansion material 53. At one end of hydraulic cylinder 51 is hydraulic plunger 52, and at its other end is heating element 54 into which run energizing leads 55 and 56. Expansion material 53 is prevented from escaping into lower casing 58 by ring seal 57.

According to the preferred embodiment, the apparatus of the invention functions as will hereinafter be described.

In FIG. 1, the apparatus is shown in its activated, level position. However, preliminarily it should be explained that when in a deactivated state, the apparatus assumes a non-level position determined by the collapsed condition of leveling thermal motor 9. Leveling thermal motor 9 is a bellows-type device filled with material having a high thermal coefficient of expansion (hereafter "expansion material") and heated by heating coil 43 which is wound around the bellows. It functions on the principle that when current is induced into heating coil 43 heat is generated which passes through the bellows wall into the expansion material, which expands causing the bellows to distend in a direction perpendicular to its folds, thereby then translating the heat into linear motion. Optimum performance of such a thermal motor is dependent on the thinness of the bellows wall and the rapidity with which the heating coil will respond to changes in current flow. This is because the greater the responsiveness of the thermal motor, the less oscillation and backlash will be experienced in the system.

Since in this embodiment leveling thermal motor 9 is intended to operate at an average interior temperature of approximately 200 degrees fahrenheit, it is clear that the collapsed condition of leveling thermal motor 9 at the lesser temperatures prevailing when the apparatus is not activated would raise collimated laser beam 33 in relation to base 1 as cradle 2 turned on pivot axis 21.

The level state of lasertube 3 is therefore achieved only after the apparatus has been activated. Current enters the self-leveling system through self-leveling system power supply terminals 18 and 19 which are contained in electronic transducer control circuit board 10, a feature of the apparatus which is standard in the current art and will therefore not be described in detail herein. It is sufficient to mention that it is electronic transducer control circuit board 10 together with electrical leveling transducer 8 that serves to adjust the flow of current into leveling thermal motor 9, causing the current flow to increase when expansion of leveling thermal motor 9 is necessary to achievement of a level position of lasertube 3, and causing current flow to decrease when it is necessary for leveling thermal motor 9 to collapse.

Electrical leveling transducer 8 is also a feature known to the current art. Basically, it is a vacuum bubble-type device containing a highly viscous, conductive fluid and penetrated by three wire leads. It is alligned so as to be perfectly parallel to lasertube 3 when in its primary position. When lasertube 3 is knocked out of level, electrical leveling transducer 8 is also knocked out of level, the resistance between the wire leads is changed, and current begins to flow. This current passes through level bridge balancing leads 35 and 37 and level bridge center lead 36 into electronic transducer control circuit board 10 at electronic leveling transducer balancing lead input terminals 16 and 17 and electronic leveling transducer center lead input terminal 15.

When the position of the leveling transducer 8 is disturbed, a change in current flow which is proportional to the magnitude of the disturbance is produced. This current change is sensed by the inputs of the electronic transducer control circuit board 10 which produces an output at terminals 13 and 14, which is proportioned to the input current and which is in the proper amount to increase or decrease the heat generated at heating coil 43 such that the thermal motor bellows extends or collapses as required to restore lasertube 3 to its original level position.

A secondary thermal motor operated system is incorporated into this embodiment of the invention, though it may not be necessary for all uses. This grade setting system is designed to establish and maintain lasertube 3 at a pre-selected, variable grade. It is powered by an exterior power source (not shown) which connects to grade setting electronic circuit unit 40 at grade setting power supply terminals 41 and 42.

Grade setting electronic circuit unit 40 is a feature of the apparatus which is standard in the current art. It is equipped with numerical grade readout 45 (pictured in FIG. 2) and grade setting adjustment 38, which allow a user of the apparatus to pre-select a particular grade of lasertube 3 other than a precisely level state.

Achievement of the pre-selected grade, like achievement of a level state, is based on a novel use of a thermal motor. Grade thermal motor 24 is suspended between cradle extension arm 23 and transducer platform 20 and is attached to both. Cradle extension arm 23 is in a fixed position relative to cradle 2, but transducer platform 20 can move axially on pivot axis 22. Thus, expansion and contraction of grade thermal motor 24 changes the angle or grade between electrical leveling transducer 8 and lasertube 3.

Like leveling thermal motor 9, grade thermal motor 24 is, in this embodiment, intended to operate at an average interior temperature of approximately 200 degrees fahrenheit. At this temperature, electrical leveling transducer 8 and lasertube 3 are parallel and the self-leveling system will keep lasertube 3 perfectly level. To change the angle between electrical leveling transducer 8 and lasertube 3 it is necessary merely to change the interior temperature of grade setting thermal motor 24.

Maintenance of operating temperature and changes in temperature are accomplished by means of heating coil 44 which heats the expansion material contained in grade thermal motor 24 through its bellows-type walls. Current is induced into heating coil 44 through grade thermal motor energizing leads 25 and 26 which are connected to grade setting electronic circuit unit 40 at grade thermal motor energizing terminals 29 and 30. Grade setting electronic circuit unit 40 is connected to thermal sensor 39, which penetrates directly into and senses the temperature of the expansion material contained in grade thermal motor 24. Thermal sensor 39 provides a resistance or current analog of the thermal motion's expansion material by means of thermal sensor leads 27 and 28. The analog is provided to grade-setting electronic circuit 40 at terminals 31 and 32.

Grade setting electronic circuit unit 40 converts the grade information set into the circuit unit by grade setting adjustment 38 into electronic signals proportioned to the correct temperature required to maintain the extension of thermal motor 24 at the precise value to maintain the grade selected. Current provided to the heating coil 43 of thermal motor is increased or decreased as required to cause the thermal motor to expand or contract. Whether expansion or contraction is required is determined by the temperature information obtained from thermal sensor 39.

When the desired temperature is achieved within the thermal motor 24, corresponding to the grade setting desired, current is stabilized by grade setting electronic circuit unit 40 thereby maintaining the grade of the laser beam at the preselected valve.

It may be seen from this embodiment that once the desired grade is achieved, the self-leveling system will be active to maintain such grade. This is because in this embodiment leveling thermal motor 9 acts to maintain the object level state of electrical leveling transducer 8 even when electrical leveling transducer 8 and lasertube 3 are not parallel.

FIG. 4 illustrates one of the many possible thermal motor designs which could be used in the present invention as alternatives to the bellows-type thermal motor which has been described as part of the preferred embodiment herein. In this plunger-type thermal motor, heating element 54 is placed in direct contact with expansion material 53 which, when heated, expands to drive hydraulic plunger 52 through hydraulic cylinder 51. Because of the direct contact of heating element 54 with expansion material 53, ring seal 57 is provided to prevent leakages into lower casing 58 which contains the contact points between heating element 54 and energizing leads 55 and 56.

What is claimed is:

1. An apparatus for automatically maintaining the angular position of the light beam produced by a light source, comprising:
    a base;
    pivotal mounting means attached to the base, for mounting the light source;
    a thermal motor having a heating coil and having two ends the linear displacement between which is responsive to the current applied to the heating coil, one end of said thermal motor being attached to the base and the other end being attached to the cradle;
    a level-sensing transducer having electrical signal outputs which are indicative of the displacement of the transducer with respect to a level position, and;
    control means connected to the heating coil of the thermal motor for producing a current in said heating coil in the proper magnitude and phase relationship such that a displacement in the position of the level-sensitive transducer is corrected by a corresponding displacement in the thermal motor such that the original position of the level-sensitive transducer is maintained.

2. The apparatus of claim 1 including means for mounting the level-sensitive transducer such that the angular displacement between the transducer and the light source may be varied.

3. The apparatus of claim 2 wherein the means for pivotally mounting the level sensitive transducer is a transducer mount which is pivotally afixed to the cradle.

4. The apparatus of claim 3 including a second thermal motor having characteristics similar to that of the first thermal motor and having one end attached to the cradle and the other end attached to the level-sensitive transducer mounting means.

5. The apparatus of claim 4 including a thermal sensor used to determine the interior temperature of the second thermal motor.

6. The apparatus of claim 5 including means for setting linear displacement of the second thermal motor by establishing and maintaining a selected internal temperature of the thermal motor.

7. The apparatus of claim 6 including control means connected to the heating coil of the thermal motor and responsive to the thermal sensor for producing a current in the heating coil in the proper magnitude and phase relationship such that changes in the ambient environment tending to cause a change in the internal temperature of thermal motor are offset by a corresponding change in the current applied to the heating coil, so that the internal temperature of the thermal motor remains constant.

* * * * *